Sept. 10, 1929.  C. R. PATON  1,727,409
AUTOMOBILE CONSTRUCTION
Filed Feb. 18, 1927
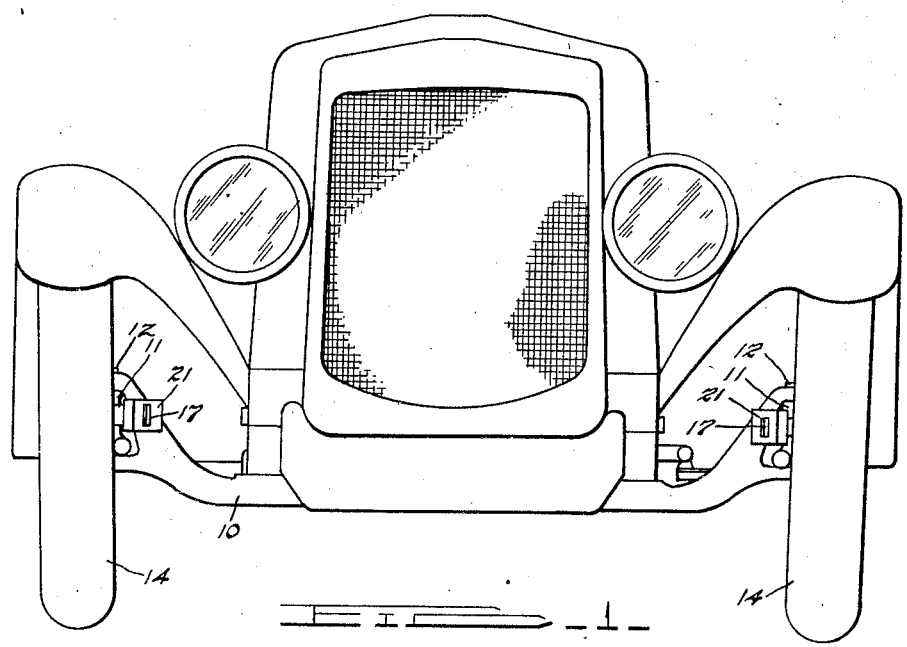
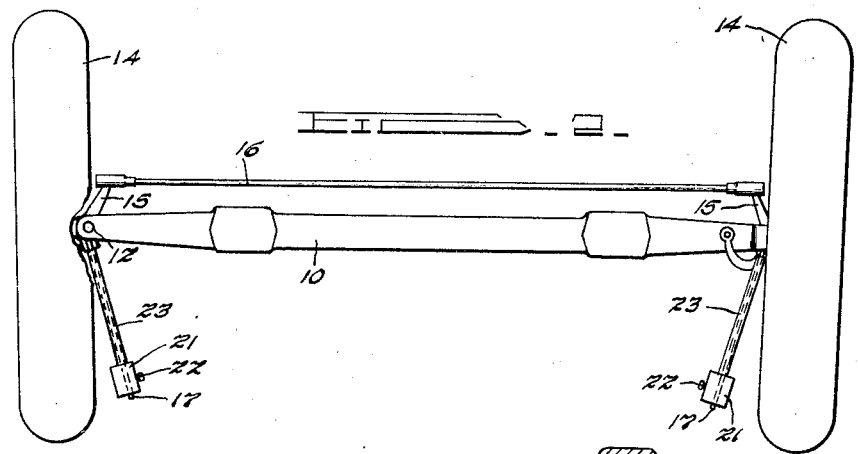
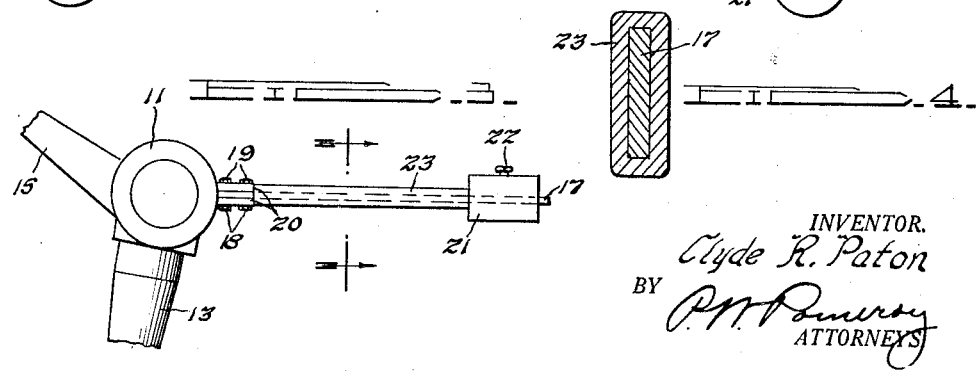
INVENTOR.
Clyde R. Paton
BY
ATTORNEYS Patented Sept. 10, 1929.

1,727,409

UNITED STATES PATENT OFFICE.

CLYDE R. PATON, OF SOUTH BEND, INDIANA, ASSIGNOR TO THE STUDEBAKER CORPORATION, OF SOUTH BEND, INDIANA, A CORPORATION OF NEW JERSEY.

AUTOMOBILE CONSTRUCTION.

Application filed February 18, 1927. Serial No. 169,200.

This invention relates to automobile constructions, and deals particularly with those vibratory movements of parts thereof commonly known as "shimmying", the principal object being the provision of a device for developing forces in opposition to the forces tending to cause shimmying, and thereby eliminating the effects thereof.

Another object is to provide means for taking up the energy tending to cause shimmying of parts of an automobile, and dissipating the same, whereby the effect thereof is substantially overcome.

Another object is to provide, in combination with those parts of an automobile subject to shimmying, a secondary vibratory system for absorbing energy from the shimmying parts and dissipating the same, thereby to eliminate the effects thereof.

Another object is to provide, in combination with those parts of an automobile subject to shimmying, a spring-controlled mass having a suitable natural period of vibration such as to be affected by such shimmying, whereby the same will absorb energy from said parts and will be caused to vibrate, suitable means being provided for resisting said vibration whereby the energy absorbed by said mass will be dissipated.

Another object is to provide, in combination with those parts of an automobile subject to shimmying movement, a spring-controlled mass movable in opposite phase to the shimmying parts and having a natural period of vibration bearing a suitable relation to the period of vibration of said parts due to shimmying, such mass being capable, by reason of the suitable relation of the periods of vibration, of taking up energy from said parts, suitable means being provided for dissipating this energy by frictionally resisting the motion of said mass.

Another object is to provide, in combination with a steering knuckle of a motor vehicle, a spring-controlled mass supported thereby and positioned to be affected by pivotal movement thereof, said mass having a natural period of vibration such as to cause it to vibrate in sympathy with the shimmying movement of said automobile and in opposite phase thereto, suitable means being provided for frictionally resisting vibration of said mass to dissipate the energy absorbed thereby.

Another object is to provide, in combination with the steering knuckles of an automobile subject to shimmying movement, a spring secured at one end to each steering knuckle in a plane perpendicular to the axis thereof, weights being secured to the free ends of said springs and being so proportioned in respect thereto as to impart a nautral period of vibration approximately equal to the period of vibration of said shimmying vibration, or a harmonic thereof, whereby when said automobile shimmies said weights will be caused to vibrate in sympathy therewith but in opposite phase thereto, said springs being encased in suitable material having a high mechanical hysteresis whereby the energy absorbed by said weights will be dissipated by the internal friction set up in said material upon being deformed.

A further object is to provide, in combination with a steering knuckle of an automobile subject to shimmying movement, a leaf spring secured at one end to said steering knuckle and projecting outwardly therefrom in a substantially radial direction in a plane substantially perpendicular to the pivotal axis of said steering knuckle, a weight being secured adjacent to the free end of said spring and so proportioned in respect thereto as to impart a natural period of vibration such that said weight will be caused to vibrate in sympathy with the shimmying movement of said automobile, said spring being provided with a co-acting strip of lead or other material having high mechanical hysteresis whereby when said weight is caused to vibrate said strip will be bent in accordance therewith, and the internal resistance offered by said strip so bent will dissipate the energy absorbed by said weight from said automobile by reason of its sympathetic vibration therewith.

The above being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Figure 1 is a more or less diagrammatic front view of an automobile incorporating a suitable embodiment of the present invention.

Figure 2 is a plan view of the front axle and wheels of the vehicle shown in Figure 1 suitably interconnected, and illustrating the relative position of the shimmy dissipating means in connection therewith.

Figure 3 is an enlarged fragmentary plan view of the left hand steering knuckle shown in Figures 1 and 2, more clearly illustrating the manner in which the shimmy dissipating means is secured thereto.

Figure 4 is a sectional view taken substantially on the line 4—4 of Figure 3.

Those vibratory movements of the steering mechanism of automobiles commonly known as "shimmying" have, since the advent of the so-called low pressure or balloon tires in the motor vehicle industry, assumed proportions of a great concern, and much time and energy have been spent in attempting to eliminate the same or the effects thereof.

Various and widely different theories have been advanced as to the cause of shimmying and various remedies suggested, and while some such remedies have been more or less successful in respect to certain constructions and conditions, they have not, to my knowledge, presented a satisfactory remedy for the majority of cases. Some have attempted to eliminate shimmying by the application of friction devices applied to directly resist movement of the shimmying parts, which is witnessed by those constructions employing frictional joints between the parts moving relative to each other, such as at the point of connection of the cross tube with the steering knuckle arms, and such as the use of conventional shock absorbers between the front axle and cross tube. Such devices, while materially resisting the shimmying, increase the effort required to steer the automobile and thus directly destroy the advantages of easy steering which all the automobile manufacturers attempt to include in their product, and which is far more desirable with low pressure tires than ever before.

With these problems in mind, I have provided a construction which, although it does not remove the cause of shimmying, does remove the effect thereof to such an extent that it will be substantially eliminated, and is eliminated as far as all practical results are concerned, without affecting the ease of steering in any manner whatsoever. In doing this, I consider those parts, the motion of which constitutes the shimmying movement, as a primary vibratory system having a natural period of vibration equal to the number of oscillations of those parts in a given interval of time. I then provide a secondary vibratory system having a natural frequency of vibration substantially the same or slightly less than the frequency of vibration of the primary system, or a harmonic thereof, positioned to be affected by the vibration of the primary system. The result is that upon vibration or shimmying of the primary system, the secondary system is caused to vibrate at substantially the same frequency therewith, and absorbs energy from the primary system. In the present invention I provide novel means for resisting this sympathetic vibration of the secondary system whereby such energy is dissipated, with the result that the energy tending to cause shimmying of the primary system is dissipated, and substantially no shimmying occurs.

In accordance with the present invention I show in Figure 1 an automobile having a front axle 10, the ends of which pivotally carry the steering knuckles 11 by the king pins 12 in a conventional manner. Each knuckle 11 is provided with a spindle 13 for supporting the co-operating wheel 14 and with a rearwardly extending arm 15, the arms 15 being pivotally connected together for relative movement by the conventional cross tube 16. These are the main parts of an automobile which shimmy and which, for ease of description, may be considered as the primary vibratory system referred to in the particular embodiment of the invention described, although other parts may be properly included, such as parts affected by movement thereof, but not properly a part of the system. These parts when shimmying have a substantially constant period of vibration, the movement of the cross tube 16 being primarily in the direction of its length, and the movement of the knuckles 11 being primarily a pivotal movement about their respective king pins 12.

The secondary vibratory system which is provided to absorb or take up energy from the primary vibratory system is shown as being made up of two separate and independent devices each of which is carried by a steering knuckle 11, and for this reason only one of said devices will be described, it being kept in mind that the same construction is applicable to both of the steering knuckles 11. Each device comprises a leaf spring 17 secured at one end by the screws 18 and nuts 19 between the flanges 20 projecting outwardly from the side of the knuckle 11, the spring 17 being disposed radially in respect to the knuckle 11, and the plane of the spring 17 being vertically disposed. A weight 21 is adjustably secured to the outer end of the spring 17 by means of a screw 22. The spring 17 is so proportioned in respect to the weight 21 that the weight 21 has a natural period of vibration substantially equal to or slightly less than the period of shimmy vibration of the vehicle, or a harmonic thereof.

As soon as the automobile begins to shimmy, the weight 21 will begin to vibrate in sympathy therewith, due to the relation of the natural periods of vibration of the two systems, and the energy causing the vibration of the weight 21 will be taken up or absorbed thereby from the automobile, or more particularly from those parts thereof which are shimmying. In order to dissipate the energy thus absorbed by the weight 21 and thereby absorb and eliminate the forces tending to cause shimmying of the automobile, I surround the spring 17 with a casing of suitable material 23 which has the desired properties of yieldability and high mechanical hysteresis, whereby when such material is bent on vibration of the weight 21, the internal friction which is set up within it due to bending, will dissipate the energy absorbed by the weight 21. The casing 23 may be formed of any one of a variety of different material such as fabric, or fabric impregnated with rubber, or similar material, or rubber material reinforced with textile material, or it may be lead, soft copper, or any like material which is readily yieldable and has the property of high mechanical hysteresis. Such material should have a considerable amount of internal friction so that when it is made to yield upon vibration of the weight 21 a considerable part of the work done upon it will be absorbed by the material itself. Due to the internal friction of the material 23, the energy taken up by the weight 21 is dissipated and the energy tending to cause shimmying of the parts of the automobile is thereby taken up and dissipated and is not allowed to build up to a point where the shimmying effect is apparent. I have found that if the forces tending to cause shimmying are checked in their incipient stages, and before they have had an opportunity to build up to a point where their effect is apparent, no apparent shimmying will occur, and that the energy necessary to be dissipated to prevent these forces from building up is relatively small. For this reason it is not necessary that the casing 23 be capable of dissipating a large amount of energy. The thickness of the casing 23 will, of course, depend to a great extent upon the material used, and in applying the present invention to various constructions the thickness may be determined by experimentation and thereby be cut down to the minimum allowable dimensions.

It is to be noticed that the present invention does not aim to eliminate the cause of shimmying, nor does it attempt to eliminate shimmying completely, but it does contemplate the control of the forces tending to cause shimmying and keeping these forces to such a small value that the effects thereof are eliminated as far as practical results are concerned. This will be apparent when it is seen that unless there is some vibration of the secondary system no energy will be dissipated, and unless there is some vibration of the primary system there will be no vibration of the secondary system. However, if the secondary system is in proper working condition the slightest shimmy vibration of the primary system will set the secondary system in motion and will prevent the forces tending to cause shimmying from building up to a point where it has any noticeable effect on the automobile of which it forms a part. It is also to be noted that the natural period of vibration of the secondary system does not need to exactly conform with the period of shimmy vibration of the primary system, or a harmonic thereof, but that it only needs to be such as to be capable of vibrating in sympathy therewith, and I have found that the result appears to be better if the natural frequency of vibration of the secondary system is slightly less than the primary system.

It will also be noted that in this construction no additional resistance whatever is offered to the free turning of the steering wheels of the automobile, and no advantage whatever in any other structure of the automobile is sacrificed in obtaining the result acquired by the use of the present invention.

Formal changes may be made in the specific embodiment of the invention described without departing from the spirit or substance of the broad invention, the scope of which is commensurate with the appended claims.

What I claim is:

1. In an automobile, in combination with those parts thereof subject to shimmying movement, a vibratory mass positioned on said automobile so as to be affected by said movement and to absorb energy from said parts by sympathetic vibration therewith, and means for frictionally resisting said vibration of said mass to dissipate said energy, said means comprising an elongated casing element formed of material having high mechanical hysteresis and positioned to be acted upon by said sympathetic vibration.

2. In an automobile, in combination with those parts thereof subject to shimmying movement, a vibratory mass secured to a steering knuckle thereof and adapted to be set in motion by said shimmying, and means for frictionally resisting said motion comprising a casing enclosing said mass adjacent its attached end, the casing being subject to equal movement with said vibratory mass and formed of a material having high mechanical hysteresis.

3. In combination with a steering knuckle of a motor vehicle, a spring secured thereto and projecting radially therefrom and capable of vibrating in a plane perpendicular to the axis thereof, a weight secured adjacent to the extremity of said spring, and an element surrounding said spring and extending substantially the length thereof adapted to be bent upon vibration of said weight formed of a material having high mechanical hysteresis.

4. In combination with the steering knuckle of a motor vehicle, a single leaf spring secured thereto and projecting radially therefrom capable of vibrating in a plane perpendicular to the axis thereof, a weight secured adjacent to the extremity of said spring, and an element secured to said spring and extending substantially the length thereof having equal bending movement therewith formed of a material offering high internal frictional resistance to being bent.

5. In combination with a steering knuckle of a motor vehicle, means for neutralizing shimmying movements thereof comprising a leaf spring secured at one end to said knuckle and projecting radially therefrom, said spring being capable of vibration in a plane substantially perpendicular to the axis of said knuckle, a weight adjustably carried by said spring, and a yieldable casing surrounding said spring and having equal movement therewith formed of a material having high mechanical hysteresis.

6. In combination with the steering knuckle of a motor vehicle, a leaf spring secured at one end to said steering knuckle and projecting radially therefrom, a weight secured adjacent the free end of said spring and so proportioned in respect thereto as to have a natural period of vibration approximately equal to the period of shimmy vibration of said knuckle, or a harmonic thereof, and a yieldable casing enclosing said spring adapted for equal movement therewith, said element formed of a material which offers high internal frictional resistance to being bent.

7. In combination with a motor vehicle subject to shimmying movement, a steering knuckle, a leaf spring secured to one end of said steering knuckle and projecting radially therefrom, a weight secured adjacent to the free end of said spring and so proportioned in respect thereto as to have a natural period of vibration approximately equal to the period of shimmy vibration of said motor vehicle, or a harmonic thereof, whereby said weight will be caused to vibrate in sympathy with said shimmy movement, and a casing surrounding said spring formed of a yieldable material having high mechanical hysteresis whereby the energy absorbed by said weight from said knuckle by sympathetic vibration therewith will be dissipated by the resistance offered to bending of said casing.

Signed by me at South Bend, Indiana this 15th day of February 1927.

CLYDE R. PATON.